United States Patent
Suekuni

(10) Patent No.: US 7,287,778 B2
(45) Date of Patent: Oct. 30, 2007

(54) AIR BAG SYSTEM

(75) Inventor: Tomohiro Suekuni, Okazaki (JP)

(73) Assignee: Mitsubishi Jidosh Kogyo Kabushiki Kaisha, Tokyo (JP)

( * ) Notice: Subject to any disclaimer, the term of this patent is extended or adjusted under 35 U.S.C. 154(b) by 364 days.

(21) Appl. No.: 10/973,244

(22) Filed: Oct. 27, 2004

(65) Prior Publication Data

US 2005/0087966 A1    Apr. 28, 2005

(30) Foreign Application Priority Data

Oct. 28, 2003   (JP)  ............................. 2003-367739

(51) Int. Cl.
*B60R 21/16* (2006.01)
(52) U.S. Cl. .................... 280/730.2; 280/735
(58) Field of Classification Search ............ 280/730.2, 280/736, 735, 739; 180/282
See application file for complete search history.

(56) References Cited

U.S. PATENT DOCUMENTS 6,386,581 B1 *  5/2002  Ohno .......................... 280/735

7,066,489 B2 *  6/2006  Hsu et al. .................... 280/739

FOREIGN PATENT DOCUMENTS

JP     2001-260806 A    9/2001

* cited by examiner

*Primary Examiner*—Paul N. Dickson
*Assistant Examiner*—Robert Coker
(74) *Attorney, Agent, or Firm*—Birch, Stewart, Kolasch & Birch, LLP

(57) ABSTRACT

An air bag system is provided with an air bag body, an inflator unit, and a sensor unit. The sensor unit is provided with a first sensor which detects an impact of a vehicle, a second sensor which detects a rolling-over of the vehicle, and a controller. When an impact of the vehicle is detected by the first sensor, the first inflator is actuated so that gas is supplied to the air bag body. Thereby, an internal pressure of the air bag body reaches a first pressure. When a rolling-over of the vehicle is detected by the second sensor, both the first and second inflators are actuated. Thereby, the internal pressure of the air bag body reaches a second pressure higher than the first pressure.

8 Claims, 5 Drawing Sheets

AIR BAG SYSTEM

CROSS-REFERENCE TO RELATED APPLICATIONS

This application is based upon and claims the benefit of priority from prior Japanese Patent Application No. 2003-367739, filed Oct. 28, 2003, the entire contents of which are incorporated herein by reference.

BACKGROUND OF THE INVENTION

1. Field of the Invention

The present invention relates to an air bag system equipped in vehicles such as an automobile.

2. Description of the Related Art

In order to protect an occupant at a time of a side impact time of an automobile and prevent an occupant from being thrown out of the automobile at a time of a roll over thereof, an automobile equipped with a so-called curtain air bag has been known. A curtain air bag of this kind has been disclosed, for example, in Jpn Pat. Appln. KOKAI Publication No. 2001-260806.

An occupant-protective device disclosed in Jpn. Pat. Appln. KOKAI Publication No. 2001-260806 has two functions. One of the functions is to actuate both a curtain air bag and a seat pretensioner at a time of an urgent roll over at which an absolute value of a roll velocity of a vehicle body is large, and the other thereof is to make the curtain air bag inoperative and actuate only the seat pretensioner at a time of a calm roll over at which the absolute value of the roll velocity is small. In a vehicle equipped with such a curtain air bag, it is desired to suppress an internal pressure of the curtain air bag to a low value in order to properly protect the head of an occupant at the time of the side impact time of the vehicle.

However, when the internal pressure in the curtain air bag is low at the time of the roll over, a shape-holding power of the curtain air bag lowers. For this reason, when a window on a lateral area of a vehicle body is opened or a window glass breaks, a performance for holding an occupant inside the vehicle being rolling may lower.

BRIEF SUMMARY OF THE INVENTION

In view of the above, the present invention provides an air bag system which can protect an occupant more properly both at a time of an impact and at a time of a roll over.

According to the present invention, there is provided an air bag system which has an air bag body supplied with gas from an inflator unit to be expandable along a roof side rail section of a vehicle between a lateral area of the vehicle and an occupant seating on a seat. The air bag system is provided with impact-detective means for detecting impact acting on the vehicle, roll-detective means for detecting rolling-over of the vehicle, and control means.

The control means controls pressure of supply gas supplied to the air bag body such that, when rolling-over of the vehicle is detected by the roll-detective means, an internal pressure of the air bag body at an expansion time thereof reaches a first pressure which protects an occupant from an impact, while the internal pressure at an expansion time of the air bag reaches a second pressure higher than the first pressure, when rolling-over of the vehicle is detected by the roll-detective means.

The first pressure is set to a relatively low pressure so as to allow proper protection of an occupant from a side impact or the like. The second pressure is set to a value higher than that of the first pressure such that a shape-holding power of the air bag body (curtain air bag) becomes higher than that generated at the first pressure.

The air bag system of the present invention can control an internal pressure of the air bag body differently corresponding to a time of an impact of the vehicle and a time of a roll over thereof, respectively. That is, according to the air bag system of the present invention, internal pressures of the air bag body corresponding to respective situations can be obtained, which allows development of an optimal occupant protective performance.

In one aspect of the present invention, the inflator unit includes a first inflator and a second inflator. The control means actuates the first inflator at a time of an impact of the vehicle, while it actuates both the first inflator and the second inflator at a time of a roll over of the vehicle.

In another aspect of the invention, the control means has an opening mechanism which can discharge gas supplied to the air bag body to the outside of the air bag body. The internal pressure of the air bag body generated when the opening mechanism is actuated is defined as the first pressure, while the internal pressure of the air bag body generated when the opening mechanism is closed is defined as the second pressure.

In still another aspect of the invention, the opening mechanism is provided with a gas supplying passage portion which causes a plurality of tubular portions of the air bag body to communicate with one another. In another aspect of the invention, the opening mechanism is provided with a tubular passage portion connecting the inflator unit and the air bag body to each other.

Other objects and advantages of the present invention will be made apparent from the following description or will be made apparent from embodiments of the invention. Various objects and advantages of the invention can be achieved by a constitution(s) or a combination(s) of constitutions clearly described in the scope of claims attached hereto

BRIEF DESCRIPTION OF THE DRAWINGS

The accompanying drawings constituting part of this text illustrate current preferred embodiments of the present invention, and contribute to explanation of the gist of the present invention in cooperation with the above-described schematic description and the detailed description about the following preferred embodiments.

DETAILED DESCRIPTION OF THE INVENTION

A first embodiment of the present invention will be explained below with reference to FIG. 1 to FIG. 3.

Figure 1:
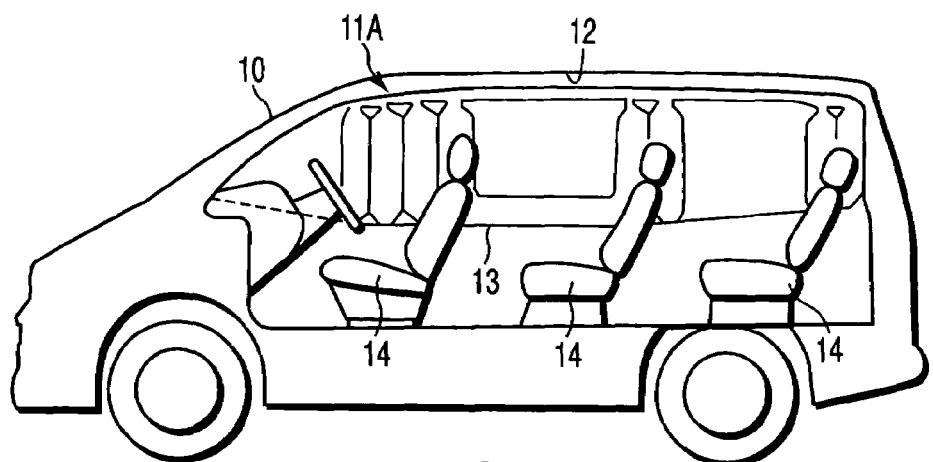
FIG. 1 is a side view illustratively showing an inside of an automobile where an air bag of an air bag system according to a first embodiment of the present invention has been developed.

A vehicle 10 shown in FIG. 1 is equipped with an air bag system 11A. The air bag system 11A is provided with an air bag body (a curtain air bag) 13 arranged along a roof side rail section 12 of the vehicle 10. The air bag body 13 is expandable between an occupant seating on a seat 14 and a lateral area of the vehicle 10. The air bag body 13 is ordinarily accommodated in the roof side rail section 12 in a folded state thereof. FIG. 1 shows a state that the air bag body 13 has been expanded (or developed).

Figure 2:
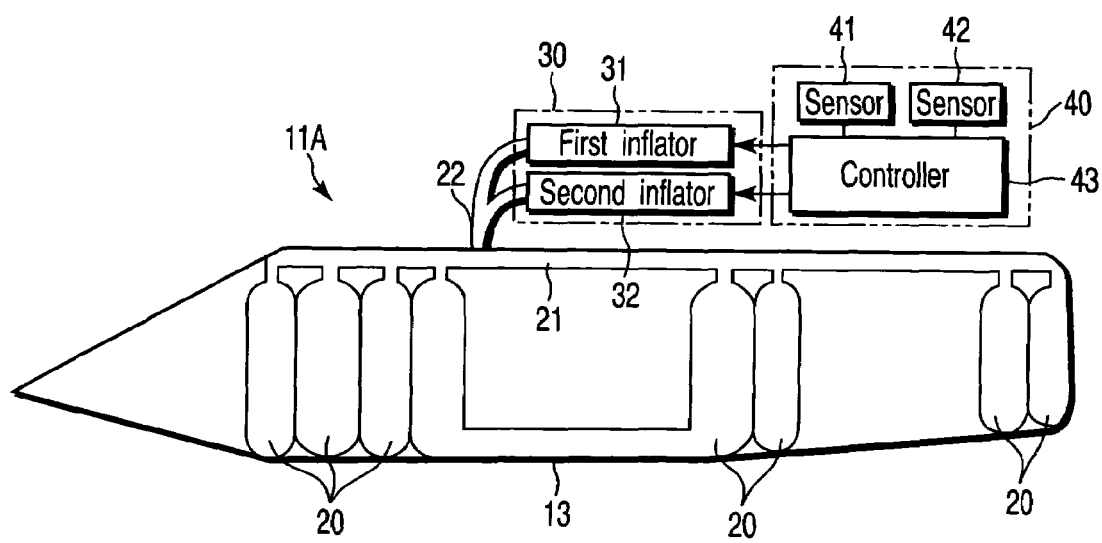
FIG. 2 is a side view showing an air bag body of the air bag system shown in FIG. 1 together with a sensor unit.

As shown in FIG. 2, the air bag body 13 has a plurality of comparted tubular portions 20. The tubular portions 20 communicate with one another via a gas passage portion 21. A tubular passage portion 22 connected to the gas passage portion 21 is connected to an inflator unit 30 for supplying gas to the air bag body 13.

The inflator unit 30 according to the embodiment includes a first inflator 31 and a second inflator 32. Actuation of the inflators 31 and 32 is controlled by a sensor unit 40 functioning as control means defined in this text.

The sensor unit 40 has a first sensor (the so-called lateral G sensor) 41 constituting one example of impact-detective means for detecting a side impact acting on the vehicle 10, a second sensor (a roll rate sensor) 42 constituting one example of roll-detective means for detecting a rolling-over of the vehicle 10, and a controller 43.

Figure 3:
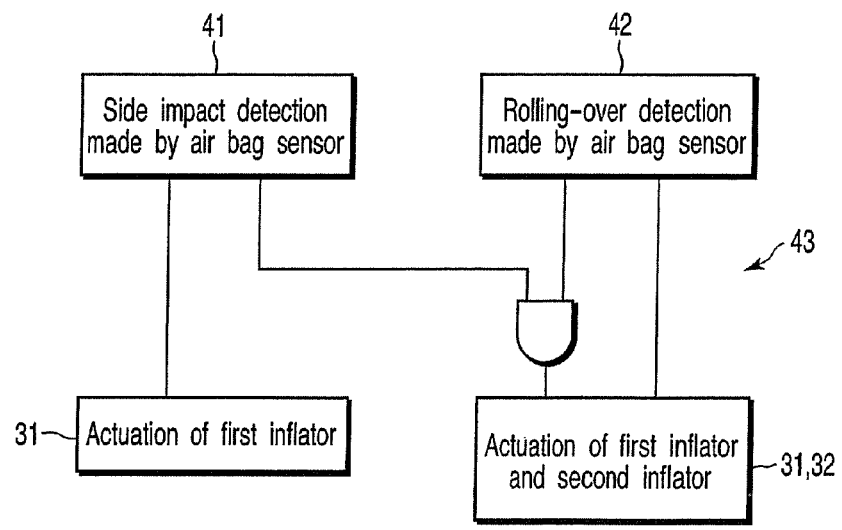
FIG. 3 is a block diagram showing a function of a controller of the air bag system shown in FIG. 1.
Figure 4:
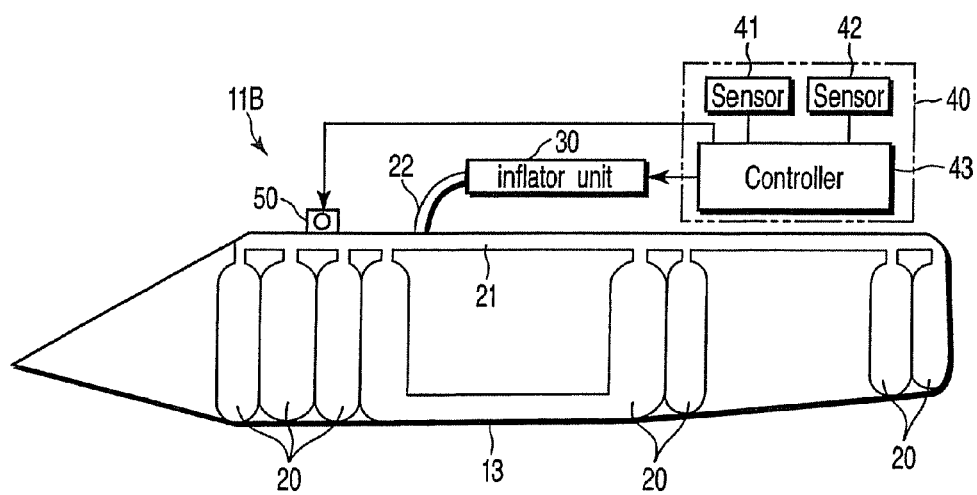
FIG. 4 is a side view showing an air bag system of a second embodiment of the present invention.

As shown in FIG. 3, the controller 43 outputs a signal for actuating the first inflator 31, when side impact acting on the vehicle 10 is detected by the first sensor 41. The controller 43 outputs a signal for actuating both of the first inflator 31 and the second inflator 32, when rolling-over of the vehicle 10 is detected by the second sensor 42.

The controller 43 outputs a signal for actuating both the first inflator 31 and the second inflator 32, even when rolling-over is detected by the second sensor 42 after side impact is detected by the first sensor 41.

That is, the sensor unit 40 has two functions. One of the functions is to output a signal for setting an internal pressure of the air bag body 13 expanded at a side impact time of a vehicle to a first pressure suitable for protecting the head of an occupant or the like. The other is to output a signal so as to supply an amount of gas generated at a roll over time of a vehicle more than that generated at a side impact time of a vehicle to set the internal pressure of the air bag body 13 to a second pressure higher than the first pressure.

Next, an operation of the air bag system 11A will be explained.

When a side impact acting on the vehicle 10 is detected by the first sensor 41, the first inflator 31 is actuated by an ignition signal outputted by the controller 43. Gas is supplied from the first inflator 31 to the air bag body 13 so that the air bag body 13 is expanded. The air bag body 13 is developed into a shape of a curtain between an occupant seating on the seat 14 and the lateral area of the vehicle body. An internal pressure of the air bag body 13 generated at that time is the first pressure which allows proper protection of the occupant from the side impact. This will be effective for reducing a damaging value or possibility to the head of the occupant.

When a rolling-over of the vehicle 10 is detected by the second sensor 42, both the first inflator 31 and the second inflator 32 are actuated according to an ignition signal outputted by the controller 43. In this case, gas is supplied from the first and second inflators 31, 32 to the air bag body 13, so that the internal pressure of the expanding air bag body 13 reaches the second pressure higher than the first pressure. Therefore, the shape-holding power of the air bag body 13 is increased so that a possibility that an occupant is thrown out from a vehicle at a time of the roll over of the vehicle 10 can be reduced.

Even when the rolling-over of the vehicle 10 is detected by the second sensor 42 after a side impact is detected by the first sensor 41, both the first inflator 31 and the second inflator 32 are actuated by an ignition signal outputted from the controller 43. Thereby, gas of an amount more than that generated at the time of the side impact is supplied to the air bag body 13 so that the internal pressure of the air bag body 13 at an expansion time thereof becomes the second pressure higher than the first pressure.

Thus, the air bag apparatus 11A according to the embodiment can develop a more proper occupant-protective performance by controlling the internal pressure of the air bag body 13 in a different manner between a time of a side impact and a time of a roll over of a vehicle. Incidentally, such a constitution can be employed that the internal pressure of the air bag body is controlled further finely by a combination of three or more inflators.

Figure 5:
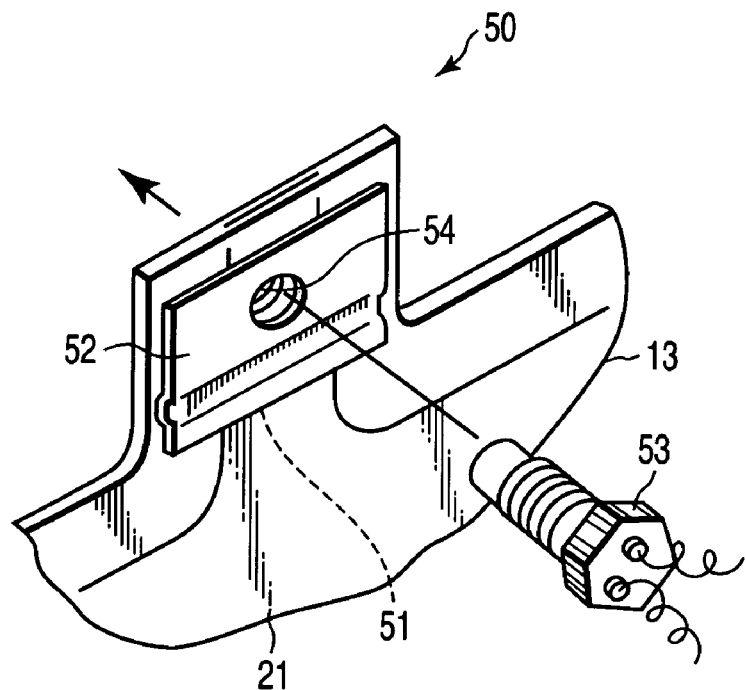
FIG. 5 is a perspective view of a pressure adjusting unit of the air bag system shown in FIG. 4.

FIGS. 4 to 7 show an air bag system 11B of a second embodiment of the invention. The air bag system 11B is provided at the gas passage portion 21 of the air bag body 13 with a pressure adjusting unit 50 functioning as an opening mechanism in the control means. As shown in FIG. 5, the pressure adjusting unit 50 is provided with a pressure spilling hole 51 formed in the air bag body 13, sealing plates 52, a bolt with a built-in squib 53, and the like.

Figure 6:
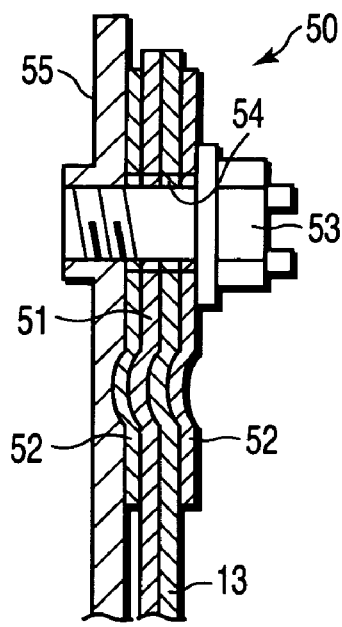
FIG. 6 is a sectional view of the pressure adjusting unit of the air bag system shown in FIG. 4.

The bolt with a built-in squib 53 is inserted into through-holes 54 formed in the air bag body 13 and the sealing plates 52 to be fixed to a member 55 of the vehicle side (shown in FIG. 6). The sealing plates 52 are ordinarily fixed to the member 55 of the vehicle side by the bolt with a built-in squib 53 so that the pressure spilling hole 51 is closed.

Figure 7:
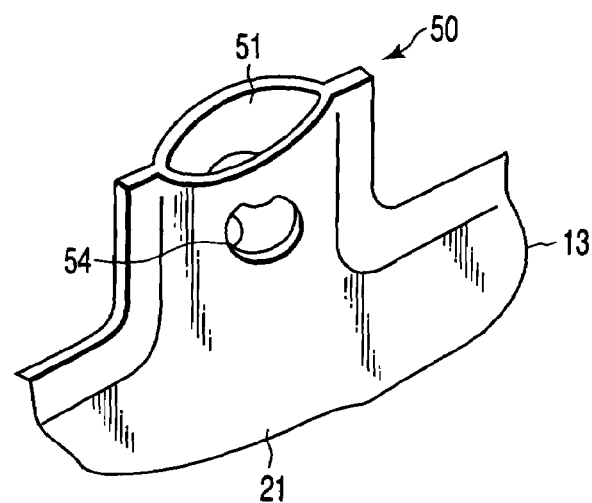
FIG. 7 is a perspective view of a state where the pressure adjusting unit of the air bag system shown in FIG. 4 has been actuated.

The bolt with a built-in squib 53 is actuated by an explosive ignited by an ignition signal like the inflator in the air bag system. When a side impact is detected by the first sensor 41, the explosive in the bolt with a built-in squib 53 is ignited by an ignition signal from the controller 43. Thereby, the bolt with a built-in squib 53 falls off from the member 55 of the vehicle side. Therefore, as shown in FIG. 7, the pressure spilling hole 51 is opened so that portion of gas generated by the inflator unit 30 is spilled out. That is, the internal pressure of the air bag body 13 at the side impact time lowers to reach the first pressure suitable for protection of an occupant.

When a rolling-over of the vehicle is detected by the second sensor 42, the bolt with a built-in squib 53 is not ignited. For this reason, gas generated by the inflator unit 30 is supplied to the air bag body 13 without spilling of portion of the gas, so that the internal pressure of the air bag body 13 being expanding reaches the second pressure. That is, a shape-holding power for the air bag body 13 becomes higher than that generated at a time of a side impact. Regarding the remaining constitutions and operations in this embodiment, the air bag system 11B is similar to the air bag system 11A according to the first embodiment shown in FIGS. 1 to 3.

Thus, the air bag apparatus 11B according to the second embodiment can also develop a more proper occupant-protective performance by controlling the internal pressure of the air bag body 13 in a different manner between the time of the side impact and the time of the roll over of the vehicle.

Figure 8:
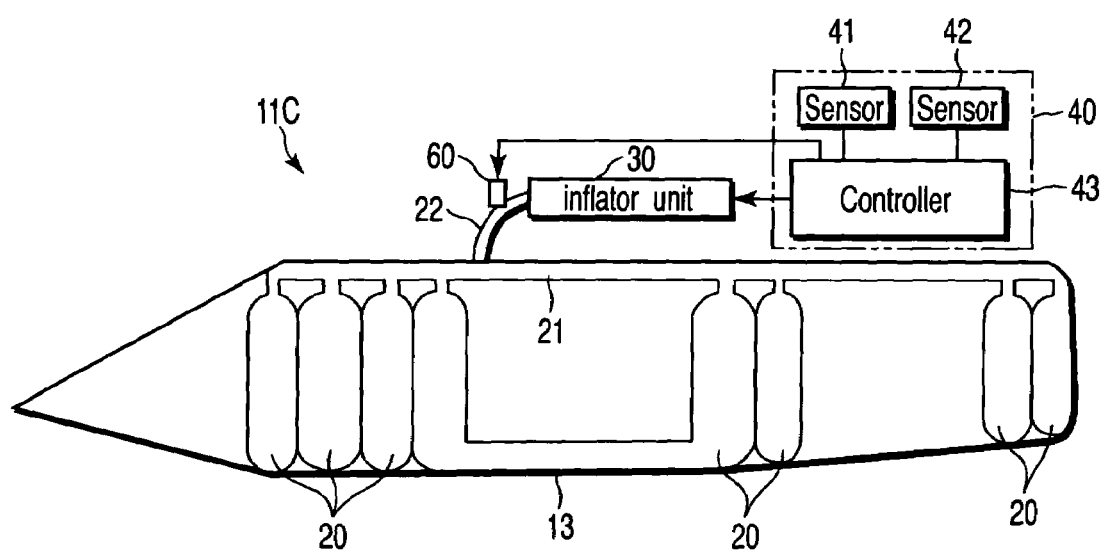
FIG. 8 is a side view showing an air bag system of a third embodiment of the present invention.
Figure 9:
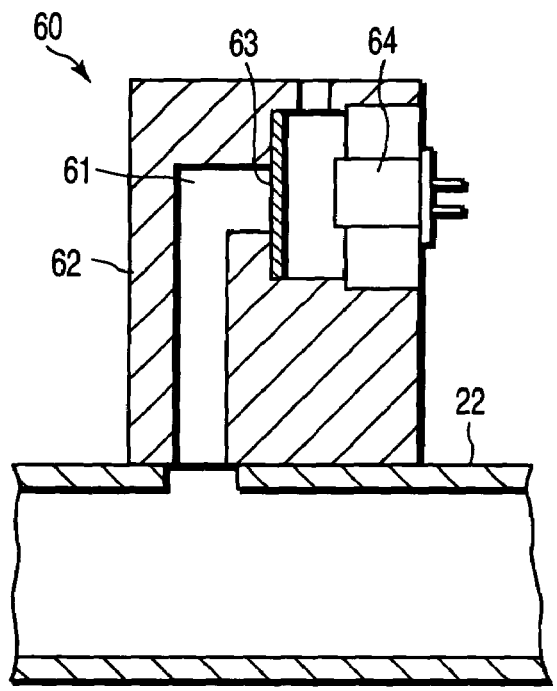
FIG. 9 is a sectional view of a pressure adjusting unit of the air bag system shown in FIG. 8.
Figure 10:
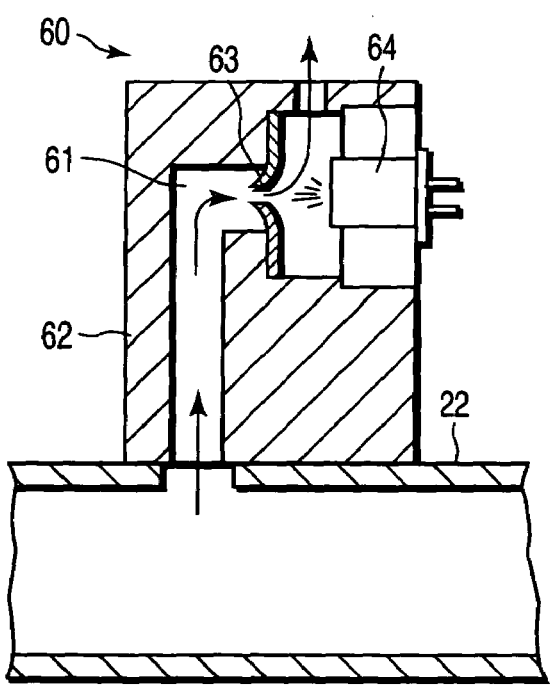
FIG. 10 is a sectional view of a state where the pressure adjusting unit of the air bag system shown in FIG. 8 has been actuated.

FIGS. 8 to 10 show an air bag system 11C according to a third embodiment of the present invention. The air bag system 11C is provided at the tubular passage portion 22 connecting the inflator unit 30 and the air bag body 13 with a pressure adjusting unit 60 serving as an opening mechanism of the control means. The pressure adjusting unit 60 is provided with a housing 62 with a pressure spilling hole 61, a burst disc 63 provided in the pressure spilling hole 61, a squib 64, and the like.

The pressure spilling hole 61 is ordinarily closed by the burst disc 63. As shown in FIG. 10, when the squib 64 is exploded, the burst disc 63 is broken to open the pressure spilling hole 61. Regarding the remaining constitutions and operations in this embodiment, the air bag system 11C is similar to the air bag system 11A of the first embodiment shown in FIGS. 1 to 3.

The squib 64 is actuated by explosive ignited by an ignition signal like the inflators for an air bag system. When a side impact is detected by the first sensor 41, the squib 64 is ignited. Thereby, the squib 64 is exploded and the burst disc 63 is broken, so that the pressure spilling hole 61 is opened, as shown in FIG. 10. The pressure spilling hole 61 is opened and portion of gas generated by the inflator unit 30 is spilled out through the pressure spilling hole 61 opened, so that the internal pressure of the air bag body 13 at the time of the side impact is lowered. That is, the internal pressure reaches the first pressure suitable for protection of an occupant.

When a rolling-over of the vehicle is detected by the second sensor 42, the inflator unit 30 is ignited without igniting the squib 64. Thereby, gas generated by the inflator unit 30 is supplied to the air bag body 13. When the gas from the inflator unit 30 is supplied to the air bag body 13 without spilling of portion of the gas, the internal pressure of the air bag body 13 at the time of the rolling-over thereof reaches the second pressure higher than the first pressure. That is, a shape-holding power of the air bag body 13 is increased.

Thus, the air bag system 11c according to the third embodiment can develop an optimal occupant-protective performance by controlling the internal pressure of the air bag body 13 differently between the time of the side impact and the time of the roll over of a vehicle. Incidentally, such a constitution can be employed in each embodiment that a rolling-over of a vehicle can be determined based upon data obtained by a sensor and a map stored in a memory of a computer.

In implementation of the present invention, of course, the constituent elements of the present invention including the air bag body or the inflator, the impact-detective means, and the roll-detecting means may be modified properly without departing from the scope or spirit of claims.

The other advantages and modifications may be thought out by those skilled in the art. A boarder concept of the present invention is not limited to a specific detailed typical system or apparatus or illustrations described here. That is, various modifications of the present invention can be made without departing from the scope of the appending claims and a boarder concept of the present invention defined equivalently with the scope.

What is claimed is:

1. An air bag system, comprising:
    an air bag body which is expandable along a roof side rail section of a vehicle between a lateral area of the vehicle and an occupant seating on a seat;
    an inflator unit which generates gas for expanding the air bag body;
    impact-detective means for detecting impact of the vehicle;
    roll-detecting means for detecting rolling-over of the vehicle; and
    control means for controlling pressure of supply gas supplied to the air bag body such that, when impact of the vehicle is detected by the impact-detective means, an internal pressure of the air bag body at an expansion time thereof only reaches a first pressure for protecting the occupant from the impact, while an internal pressure of the air bag body at an expansion time thereof reaches a second pressure higher than the first pressure, when rolling-over of the vehicle is detected by the roll-detecting means.

2. An air bag system according to claim 1, wherein
    the inflator unit includes a first inflator and a second inflator, and the control means is constituted to actuate the first inflator at an impact time of the vehicle and actuate both the first inflator and the second inflator at a rolling-over time of the vehicle.

3. An air bag system according to claim 1, wherein
    the control means has an opening mechanism which can discharge gas supplied to the air bag body to the outside of the air bag body, where, when the opening mechanism is actuated, the internal pressure of the air bag body only reaches the first pressure, while the internal pressure of the air bag body reaches the second pressure, when the opening mechanism is closed.

4. An air bag system according to claim 3, wherein
    the opening mechanism is provided at a gas passage portion which causes a plurality of tubular portions of the air bag body to communicate with one another.

5. An air bag system according to claim 3, wherein
    the opening mechanism is provided at a tubular passage portion which connects the inflator unit and the air bag body to each other.

6. An air bag system according to claim 3, wherein
    the air bag body has a pressure spilling hole for releasing the internal pressure of the air bag body,
    wherein, the opening mechanism includes,
        a sealing plate that seals the pressure spilling hole, and
        a bolt with a built-in squib that attaches the sealing plate to the vehicle, and
    wherein, when the rolling over is detected, the control means activates the squib to remove open the pressure spilling hole.

7. An air bag system according to claim 3, wherein
    the opening mechanism includes a pressure-adjusting unit having,
        a pressure spilling hole for releasing the pressure inside the air bag body to an outside thereof,
        a burst disc that seals the pressure spilling hole, and
        a squib that ruptures the burst disc,
    wherein, when the rolling over is detected, the control means activates the squib to rupture the burst disc.

8. An air bag system according to claim 7, wherein
    the pressure-adjusting unit releases the pressure from a tubular passage portion that connects the inflator unit and the air bag body.

* * * * *

UNITED STATES PATENT AND TRADEMARK OFFICE
CERTIFICATE OF CORRECTION

PATENT NO. : 7,287,778 B2  
APPLICATION NO. : 10/973244  
DATED : October 30, 2007  
INVENTOR(S) : Tomohiro Suekuni Page 1 of 1

It is certified that error appears in the above-identified patent and that said Letters Patent is hereby corrected as shown below:

Title Page, Item (73) reads, "Mitsubishi Jidosh Kogyo Kabushiki Kaisha" and should be amended to read, --Mitsubishi Jidosha Kogyo Kabushiki Kaisha--

Signed and Sealed this

Twenty-seventh Day of May, 2008

JON W. DUDAS  
*Director of the United States Patent and Trademark Office*